United States Patent [19]
Griebell et al.
[11] Patent Number: 5,012,223
[45] Date of Patent: Apr. 30, 1991

[54] SOUND ACTIVATED DEVICE & METHOD

[75] Inventors: Charles A. Griebell, Trumbull; Christie Petrides, Monroe, both of Conn.
[73] Assignee: Black & Decker, Inc., Newark, Del.

[21] Appl. No.: 483,700
[22] Filed: Feb. 23, 1990
[51] Int. Cl.[5] .......... G08B 1/00; H04Q 1/30; G10K 11/00
[52] U.S. Cl. .......... 340/531; 340/628; 367/199; 367/197
[58] Field of Search .......... 340/531, 532, 533, 526, 340/506, 628, 629, 630, 692; 367/197-199

[56] References Cited

U.S. PATENT DOCUMENTS

| | | | |
|---|---|---|---|
| 4,417,235 | 11/1983 | Del Grande | 367/197 |
| 4,446,454 | 5/1984 | Pyle | 367/197 |
| 4,617,555 | 10/1986 | Sheiman | 367/199 |

*Primary Examiner*—Donnie L. Crosland
*Attorney, Agent, or Firm*—Barry E. Deutsch

[57] ABSTRACT

A smoke alarm activated device includes a sound receiver and signal converting device for receiving a sound wave analog signal emitted from a smoke alarm in response to the sensed presence of smoke. The signal is received and converted into a digital signal containing the informational characteristics contained within the transmitted sound wave. The digital signal is detected in a first time period which first time is identical to the time period in which the sound wave is generated. The absence of the digital signal in a second time period is detected, which second time period is identical to the time period in which the detected sound wave is absent. An output control signal is generated when the presence of the digital signal is detected in the first time period and the absence of the digital signal is detected in the second time period. A device is activated in response to the output control signal.

11 Claims, 3 Drawing Sheets

SOUND ACTIVATED DEVICE & METHOD

BACKGROUND OF THE INVENTION

This invention relates generally to sound activated devices, and more particularly to such a device which is activated in response to the audible signal from an alarm.

The use of smoke and fire detectors in homes and apartments have become increasingly common and, in some locales, are required to meet building codes for new home and apartment construction. Very often, several of these detectors are provided throughout a home or apartment. When fire or smoke is detected, the device emits a relatively loud alarm for warning the occupants of the residence of the existence of the fire or smoke. If the occupants are sleeping, the alarm is sufficiently loud and harsh to alert the persons to the danger.

In the event that the fire has progressed, it is likely that the lights powered by the main electrical system of a residence will be inoperative. The residence may be filled with an appreciable quantity of smoke so that the occupants may become disoriented and find it difficult to escape from the dark, smoke filled area. The darkness problem created by smoke will be compounded if the fire occurs during the evening hours.

Emergency escape lights that automatically turn on in the event of an alarm condition exist in the prior art. Many of the prior art lights are integrally designed into smoke or fire detecting units or are physically wired to a fire alarm or smoke detecting system. Others of the escape lights are self contained. A self contained light will turn on when a loud sound occurs within a predetermined frequency range. However, many loud noises occur within the predetermined frequency range other than the sound generated by the alarm. For example, radio, television and vacuum cleaner noises are generally within the same frequency range as is the sound generated by the alarm. Since such prior art lights are designed to be activated when the frequency of an audible noise is within a predetermined range, the light is often activated when its illumination is not actually required.

Other alarm attention directing devices, such as alarms, sirens, warning lights and the like can also be designed to be activated in response to the occurrence of noise within a predetermined frequency range as generated by a smoke alarm. It is likewise desirable that these other devices only be activated in response to the sound emitted from the smoke alarm and not be activated by sound emitted from another source.

Accordingly, it is an object of the present invention to provide a sound activated device which is automatically activated in response to its detection of sound having specific informational characteristics. It is a further object of this invention to activate a sound activated device in response to a digital signal having specific characteristics.

SUMMARY OF THE INVENTION

The foregoing objects and other objects of the invention are attained in a method of activating a device in response to detecting the emission of a sound wave having predetermined characteristics comprising the steps of generating an analog electrical signal having informational characteristics indicative of the emitted sound; converting the analog signal into a digital signal containing the informational characteristics contained within the emitted sound; detecting the presence of the digital signal in a first time period, which first time period is identical to the time period in which the detected sound wave is generated; detecting the absence of the digital signal in a second time period which second time period is identical to the time period in which the detected sound wave is absent; repeating the two detecting steps to assure that the detected sound wave has the predetermined characteristics; and activating a device with an output control signal in response to detection of the digital signal having the informational characteristics contained within the emitted signal.

The objects of the invention are also attained in a smoke alarm activated device, responsive to the transmission of a sound wave from a sound transmitting means, comprising sound receiving means physically spaced from the sound transmitting means for receiving the sound wave and for generating an analog electrical signal; means for converting the analog electrical control signal into a digital signal with informational characteristics contained within the transmitted sound wave signal; first means for detecting the presence of the digital signal in a first time period, which first time period is identical to the time period in which the detected sound wave is generated; means for detecting the absence of the digital signal in a second time period, which second time period is identical to the time period in which the detected sound wave is absent; means for generating an output control signal when the presence of the digital signal is detected in the first time period and the absence of the digital signal is detected in the second time period; and means for receiving said output control signal for activating said smoke alarm activated device in response thereto.

DESCRIPTION OF THE PREFERRED EMBODIMENT

Figure 1:
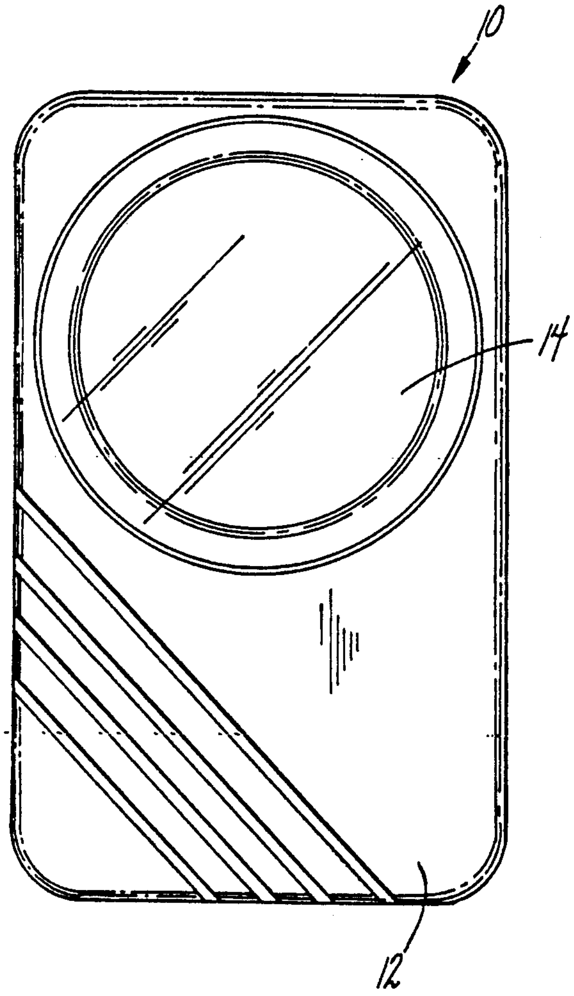
FIG. 1 is a front elevational view of a sound activated light embodying the present invention.

Referring now to the various figures of the drawing, the preferred embodiment of the present invention shall be described. In referring to the various figures, like numerals shall refer to like parts.

Figure 2:
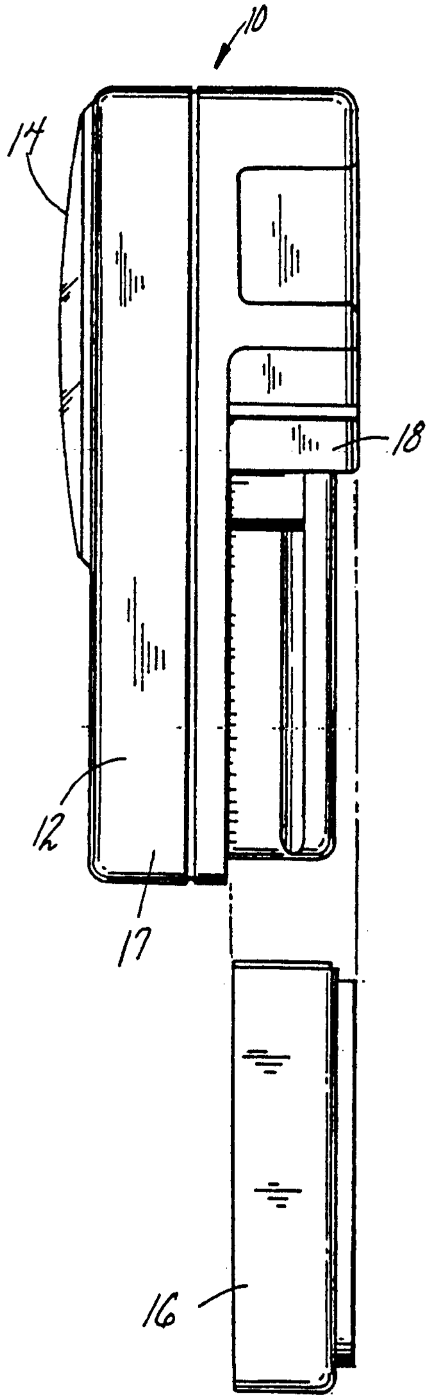
FIG. 2 is a side elevational view of the light illustrated in FIG. 1.

Referring specifically to FIGS. 1 and 2, there is illustrated a sound activated device, shown specifically as a lamp 10. Lamp 10 includes housing 12 which is preferably formed from a suitable plastic material. A lens 14 formed from suitable transparent material such as glass or plastic is mounted in the front of housing 12. A bulb (not shown) is mounted behind the lens in a typical manner to emit light. Housing 12 includes a mounting bracket 16 which is movable relative to main portion 17 of the housing. Switch 18 is positioned in vertical axial alignment with mounting bracket 16. Switch 18 has 2 positions, the first of which provides AUTO/OFF functions and the second of which provides an ON function. When lamp 10 is mounted within mounting bracket 16, switch 18 is usually set in its AUTO/OFF position.

Lamp 10 is designed to function in cooperation with a sound emitting device such as a smoke or fire detector. When switch 18 is in its AUTO/OFF position and lamp 10 detects the emission of an alarm from an associated smoke or fire detector, the lamp will be automatically placed in an operational state.

Figure 3:
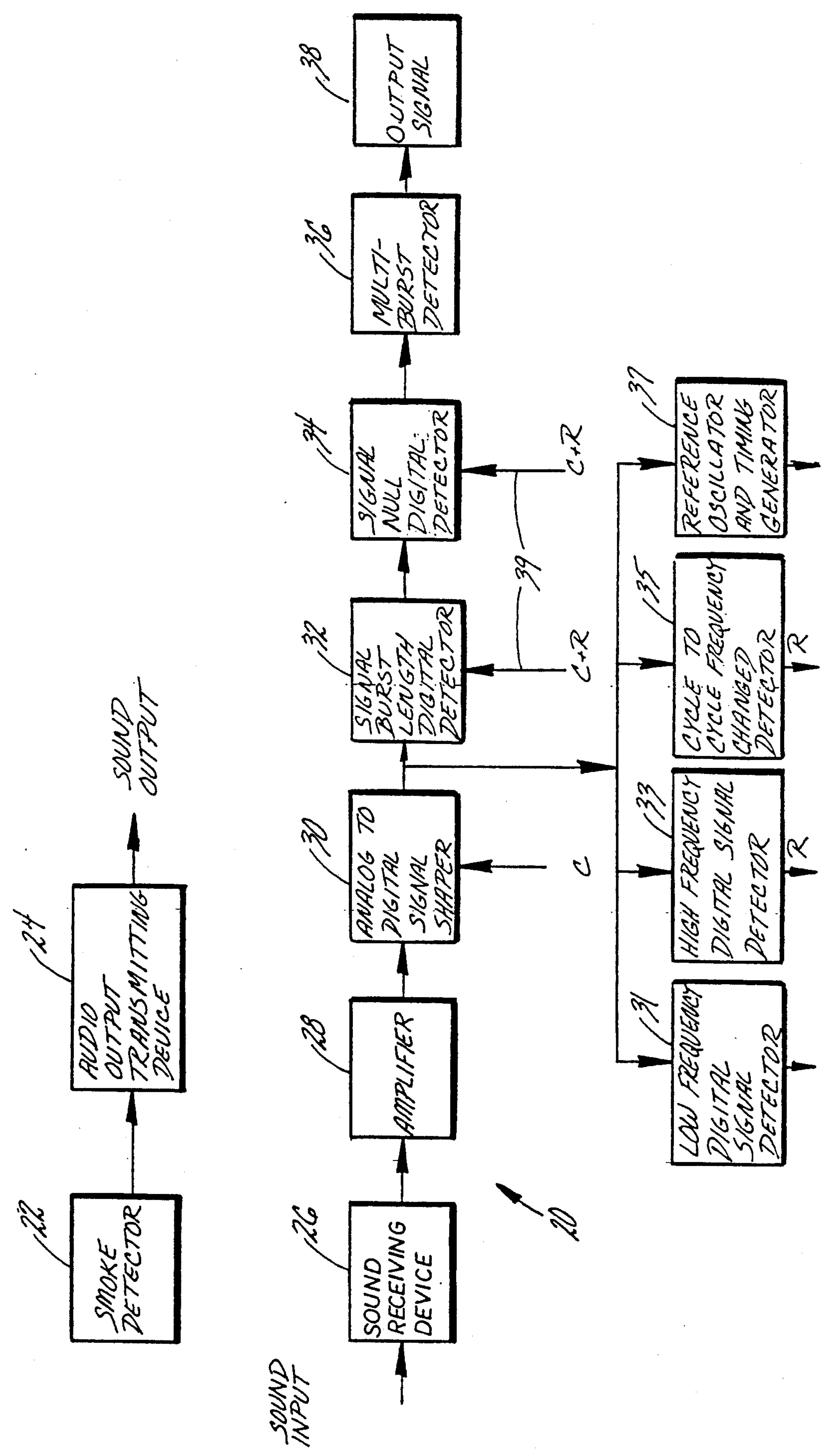
FIG. 3 is a block diagram illustrating the manner in which the present invention functions.

Referring now to FIG. 3, there is illustrated a block diagram describing the circuit of the present invention which results in lamp 10 being automatically activated in response to the detection of sound having predetermined sound wave characteristics. Circuit 20 includes a smoke detector or similar device 22 which is used to detect the presence of smoke. When smoke is detected, detector 22 generates a digital electronic signal having a specific timed wave form. The digital electronic signal energizes audio output transmitting device 24, which is typically a piezoelectric device. Device 24 transmits a sound output signal. This output signal is an audible analog signal to the electronic digital signal generated by smoke detector 22.

Circuit 20 includes a sound receiving device 26, again typically a piezoelectric device. Device 26 produces a relatively low level electrical signal. Device 26 is physically located in spaced relation to detector 22 and device 24. When device 26 senses the transmission of the audible analog signal, it produces an analog electrical signal similar in analog wave shape to the transmitted audible analog signal.

The signal generated by device 26 is transmitted to amplifier 28 and then transmitted to an analog to digital signal shaper 30. The shaped digital signal has digital logic levels and fast rise and fall times on the leading and lagging edges.

The shaped digital signal is then transmitted to a signal burst length digital detector 32, which is the first of three digital detectors (32, 34 and 36) in the digital detection path. Detector 32 detects the continuous transmission of the signal from audio output transmitting device 24 for a predetermined period of time. When this is true, a signal is sent to digital detector 34, which in turn then detects the continuous absence of a signal from audio output transmitting device 24 for a predetermined period of time. When this condition is satisfied, a digital pulse identified as a "burst-null" pulse is sent to the next and last signal detector, multi-burst detector 36. Detector 36 looks for a sufficient number of "burst-null" pulses within a predetermined time period. If this logic step is also satisfied, then the digital detection of a smoke alarm signal is complete and an output control signal is transmitted via conductor 38 for activating external devices such as lights and remote alarms. This output control signal is generated each time the correct burst-null pattern is detected. In the preferred embodiment, the period of time in which the audible signal is continuously transmitted is approximately 175 milliseconds. This time period is followed by approximately an 85 millisecond null period which would be detected by detector 34.

Digital detectors 32, 34 and 36 are matched to the digital timing signature of the smoke detector signal and are the fundamental defense against the detection of noise from sources other than the smoke alarm which might otherwise activate the external device. Random noise sources such as radio, television and vacuum cleaners do not produce the specific digital timed signal being detected.

For additional protection against noise and unwanted signals activating the external device, three noise detectors 31, 33 and 35 have been included. The shaped digital signal formed in analog to digital signal shaper 30 is the input signal to each of these three noise detectors. When one of these three detectors sense the transmission of an extraneous signal, a reset pulse is sent to digital timing detectors 32 and 34 through conductors 39 to inhibit the digital detection sequence in the digital signal detection path. Low frequency detector 31 produces a reset pulse when the frequency of the sound source is too low. High frequency signal detector 33 produces a reset pulse when the frequency of the sound source is too high. Finally, cycle to cycle frequency change detector 35 produces a reset pulse when there is an abnormal change in frequency of the transmitted signal on a cycle to cycle basis.

Circuit 20 further includes a reference oscillator and timing generator 37 which produces clock pulses used in most of the functional blocks of the circuit. To keep the quiescent current (when no signal is present) to about a 2 microampere level, the reference oscillator is only operational when the shaped digital signal transmitted from device 30 is present at the input to oscillator 37. The oscillator continues to run during the null periods existing during the transmission of the signal from audio output transmitting device 24. The frequency of the oscillator is approximately 100 KHz.

Figure 4:
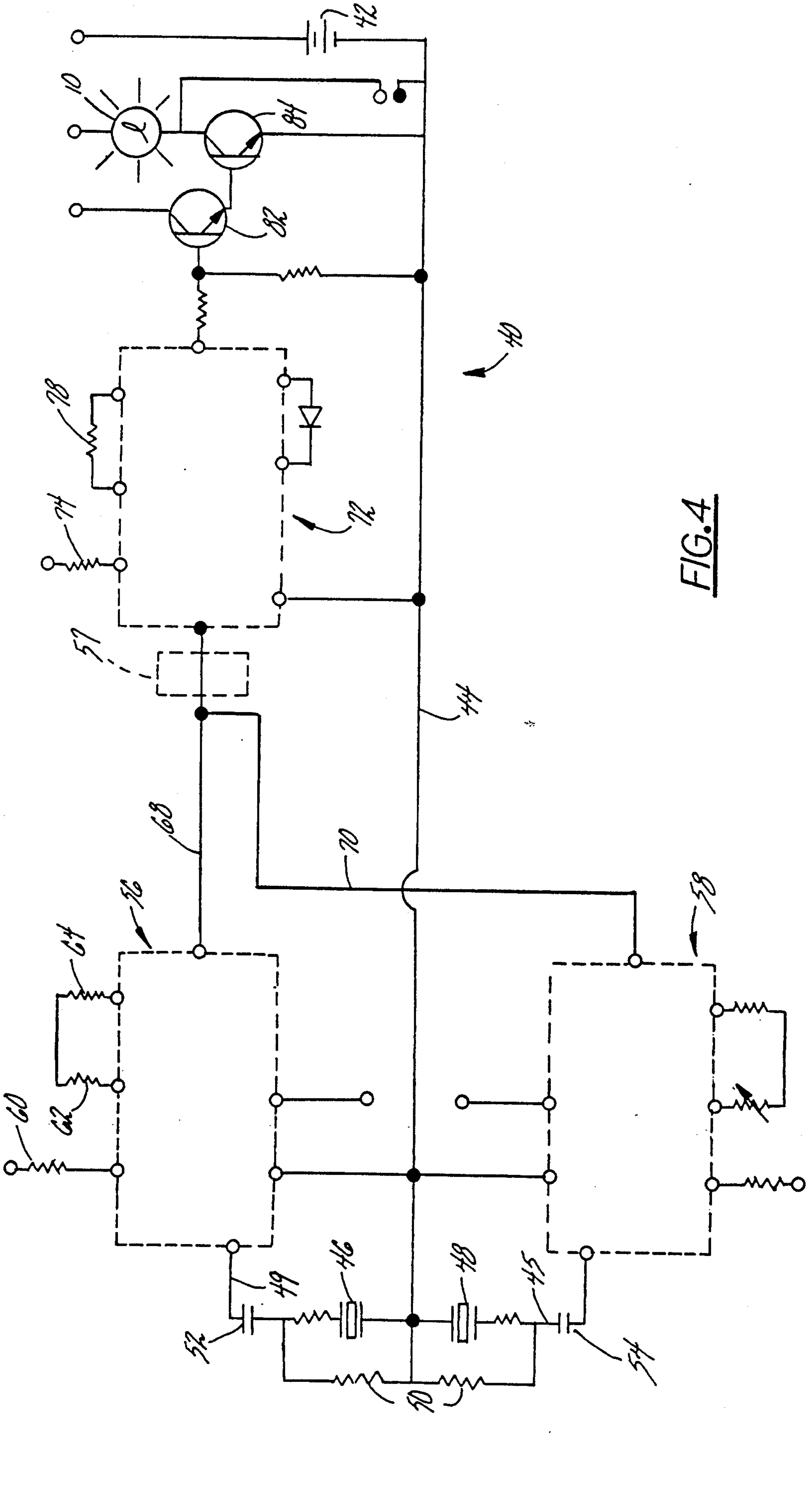
FIG. 4 is a schematic diagram illustrating details of the invention.

Referring now to FIG. 4, there shall now be described details of the preferred embodiment of circuit 40 which provides the specific functions described with respect to FIG. 3.

Circuit 40 is powered by a source of electrical power 42 which is preferably DC and is provided by two "AA" alkaline batteries 42. Piezo transducers 46 and 48 each have a resistor 50 connected therewith. Piezo transducers are made by S. Square Enterprise Co., LTD. of Taiwan and are designated by the Model Number SQT-1740. Transducers 46, 48 generate an analog electrical signal when activated in response to the sensed transmission of sound waves. Transducers 46, 48 are designed to operate within a 3 to 4 KHz band width. The analog signal generated by transducer 46 is transmitted by conductor 49 to capacitor 52 and thence to integrated circuit 56.

Capacitor 52 provides D.C. isolation between transducer 46 and integrated circuit 56. Integrated circuit 56 is an integrated circuit chip manufactured by Electronic Research & Service Organization of Taiwan and is designated by Model No. F-14241.

Chip 56 is connected to power supply 42 through resistor 60. Variable resistor 62 and fixed resistor 64 control the clock frequency of the chip. Chip 56 performs a plurality of functions. The chip receives the analog electrical signal from capacitor 52 and amplifies the signal for further processing. The chip then converts the analog electrical signal into a shaped digital signal.

The internal electronic circuitry of the chip measures the period during which the sound wave emitted from the smoke alarm continuously exists. If the measured period of time corresponds to the known predetermined period of time during which a single sound wave cycle will be emitted, a first control signal is generated. Upon receipt of the first control signal, the circuitry next measures or detects the null time period which is that period of time between consecutive cycles of the sound wave in which no sound wave exists. If the measured null period corresponds to the known null time period, a second control signal is generated. The second control signal may be transmitted directly to a third chip 72 by conductor 68.

Alternatively, the second control signal may be transmitted to a fourth chip 57 which is connected upstream of the third chip. Chip 57, if used, monitors the control signal generated by chip 56 for several continuous cycles. The chip determines if at least a predetermined number of first and second control signals have been generated within a predetermined period of time. If this logic step is satisfied, detection of a smoke alarm is complete and an output control signal is transmitted to chip 72.

A parallel circuit is provided, formed by transducer 48, capacitor 54, conductor 49 and chip 58. Chip 58 is identical to chip 56 except that the chip operates at a different clock frequency. Chip 58 provides a redundant circuit for dual diversity sound reception which yields increased operational reliability of the overall sound activated device. Essentially chips 56 and 58 operate in an "OR" circuit. The signal generated by chip 58 is transmitted by conductor 70 to a third chip 72 as an output control signal, or like the signal generated from chip 56, it may be furnished to fourth chip 57. Chip 72 is triggered when it receives an output control signal directly from either chip 56 or chip 58, or indirectly from these chips via intervening chip 57.

Chip 58 includes the same internal circuitry as chip 56 which monitor the time periods in which the digital signal is continuously transmitted and in which the signal is null. Chips 56 and 58 also include three additional functions to further minimize any false transmission of control signals from either chip. Ideally, the chips will only transmit control signals when the smoke detector has sensed a problem and is emitting an audible alarm.

The additional functions which are included in the chips include first circuitry for monitoring the frequency of the digital signal. When the frequency of the sound source producing the signal is below the known frequency of the sound emitted from the alarm, a reset pulse is generated and transmitted to timing detectors 32, 34. The pulse inhibits transmission of the output signal to chip 72.

Likewise, when the frequency of the sound source producing the signal is above the known frequency of the sound emitted from the alarm, second electronic circuitry identify the high frequency sound and generate a reset pulse which also inhibits the transmission of an output signal to chip 72.

Finally the chips include a third electronic circuitry for monitoring the digital signal transmitted as a result of several continuous cyclical emissions of the sound wave from the alarm. When the monitored signals indicate that there have been abnormal variations in the frequency of the sound wave from cycle to cycle, another reset pulse is generated to inhibit the transmission of an output signal to chip 72.

Chip 72 is an integrated circuit made by United Micro Electronic Corp. of Taiwan and is designated by Model Number CDT-3022. Chip 72 is connected to the source of power 42 through resistor 74. Chip 72 contains a reference oscillator which is only operational when this chip is performing its timing 78 determines the period of time that chip 72 remains active once it has received a control signal from either chip 56 or chip 58. In the preferred embodiment, chip 72 remains active for an 8 second period of time once it has been triggered.

The output from chip 72 is transmitted to a first transistor 82. When triggered by a pulse from chip 72, the transistor turns on which in turn activates a second transistor 84.

When transistor 84 is activated, electrical power flows from source 42 to lamp 10, thereby activating the same. The lamp will remain in an "on" state as long as chip 72 continues to deliver an electrical pulse to maintain transistor 82 in an "on" state. Since the control signals received from chips 56, 58 are designed to be transmitted within one to six seconds for as long as the smoke alarm is continuing to transmit an audible signal, the lamp will remain in an "on" state as long as the smoke alarm is sounding an alarm.

It should be noted that circuit 40 also includes a switch 18 which provides a parallel circuit for directly connecting lamp 10 to the source of power 42.

While the present circuit has been described with specific reference to activating a lamp in response to a sensed audible signal, the circuit can also be used for other applications where it is desired to activate a device in response to the generation of an audible signal.

For example other devices such as alarms, sirens, warning lights and the like can also be designed to be activated in response to the occurrence of noise generated by a smoke alarm.

While a preferred embodiment of the present invention has been described and illustrated, the invention may be otherwise embodied within the scope of the following claims.

We claim:

1. A method of activating a device in response to detecting the emission of a sound wave having predetermined characteristics comprising the steps of:
   - generating an analog electrical signal having informational characteristics indicative of the emitted sound;
   - converting the analog signal into a digital signal containing the informational characteristics contained within the emitted sound;
   - detecting the presence of the digital signal in a first time period, which first time period is identical to the time period in which the detected sound wave is generated;
   - detecting the absence of the digital signal in a second time period, which second time period is identical to the time period in which the detected sound wave is absent;
   - repeating the two detecting steps to ensure that the emitted sound wave has the predetermined characteristic; and
   - activating a device in response to transmission of the digital signal containing informational characteristics contained within the emitted signal.

2. A method of activating a device in accordance with claim 1 further including the step of;
   - inhibiting the digital signal detection sequence if the frequency of the analog electrical signal is below a predetermined range.

3. A method of activating a device in accordance with claim 2 further including the step of:
   - inhibiting the digital signal detection sequence if the frequency of the analog electrical signal is above a predetermined range.

4. A method of activating a device in accordance with claim 3 further including the steps of:
   - comparing the frequency of the analog electrical signal on a cycle by cycle basis; and inhibiting the digital signal detection sequence if there is an abnormal change in the frequency of the analog electrical signal on a cycle by cycle basis.

5. A method of activating a device in accordance with claim 1 further including the step of:

inhibiting the digital signal detection sequence if the frequency of the analog electrical signal is above a predetermined range.

6. A method of activating a device in accordance with claim 1 further including the steps of:

comparing the frequency of the analog electrical signal on a cycle by cycle basis; and inhibiting the digital signal detection sequence if there is an abnormal change in the frequency of the analog electrical signal on a cycle by cycle basis.

7. A smoke alarm activated device responsive to the transmission of a sound wave from a sound transmitting means comprising:

sound receiving means physically spaced from said sound transmitting means for receiving the sound wave and for generating an analog electrical signal;

means for converting said analog electrical signal into a digital signal with informational characteristics contained within the transmitted sound wave signal;

first means for detecting the presence of the digital signal in a first time period, which first time period is identical to the time period in which the detected sound wave is generated;

means for detecting the absence of the digital signal in a second time period, which second time period is identical to the time period in which the detected sound wave is absent;

means for generating an output control signal when the presence of the digital signal is detected in the first time period and the absence of the digital signal is detected in the second time period; and means for receiving said output control signal for activating said smoke alarm activated device in response thereto.

8. A smoke alarm activated device in accordance with claim 7 further including:

means for monitoring the emitted sound wave over a relatively prolonged period of time so that a plurality of the timing sequence of the sound wave are detected to ensure that the detected sound wave has the predetermined characteristics.

9. A smoke alarm activated device in accordance with claim 8 further including:

means for inhibiting the digital signal detection sequence if the frequency of the analog electrical signal is below a predetermined range.

10. A smoke alarm activated device in accordance with claim 7 wherein said device is a light.

11. A smoke alarm activated device in accordance with claim 7 wherein said device is an alarm attention directing device.

* * * * *